No. 827,940. PATENTED AUG. 7, 1906.
T. E. R. PHILLIPS.
RAILWAY SIGNALING.
APPLICATION FILED NOV. 11, 1904.
7 SHEETS—SHEET 1.
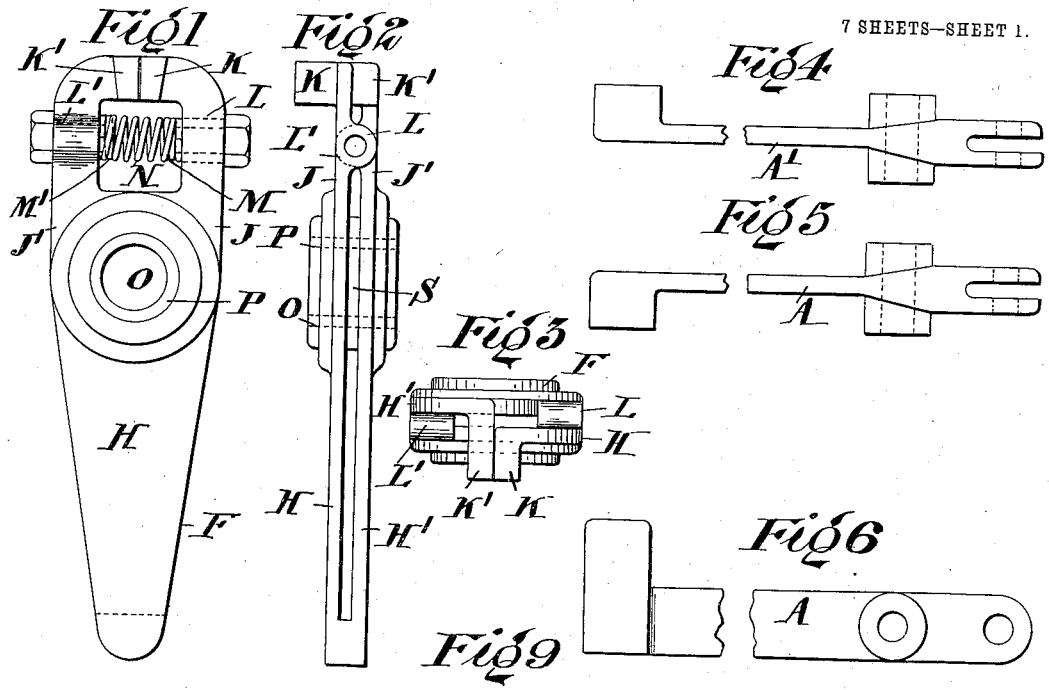
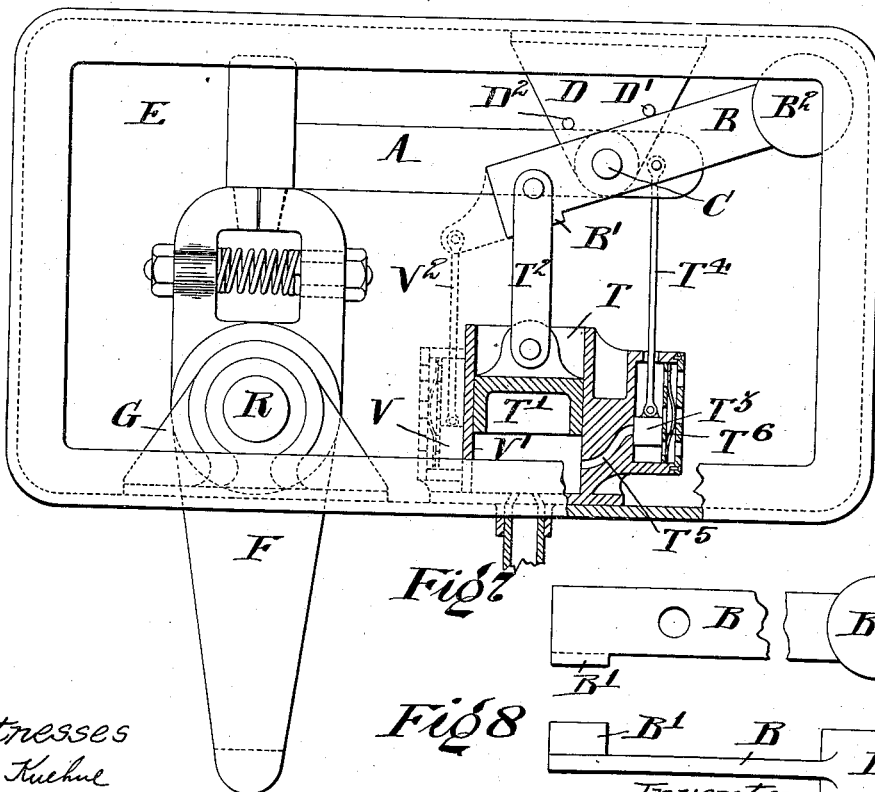
Witnesses
H. M. Kuehne
J. P. Newman
Inventor
Thomas E. R. Phillips
By Richardson
Attorneys

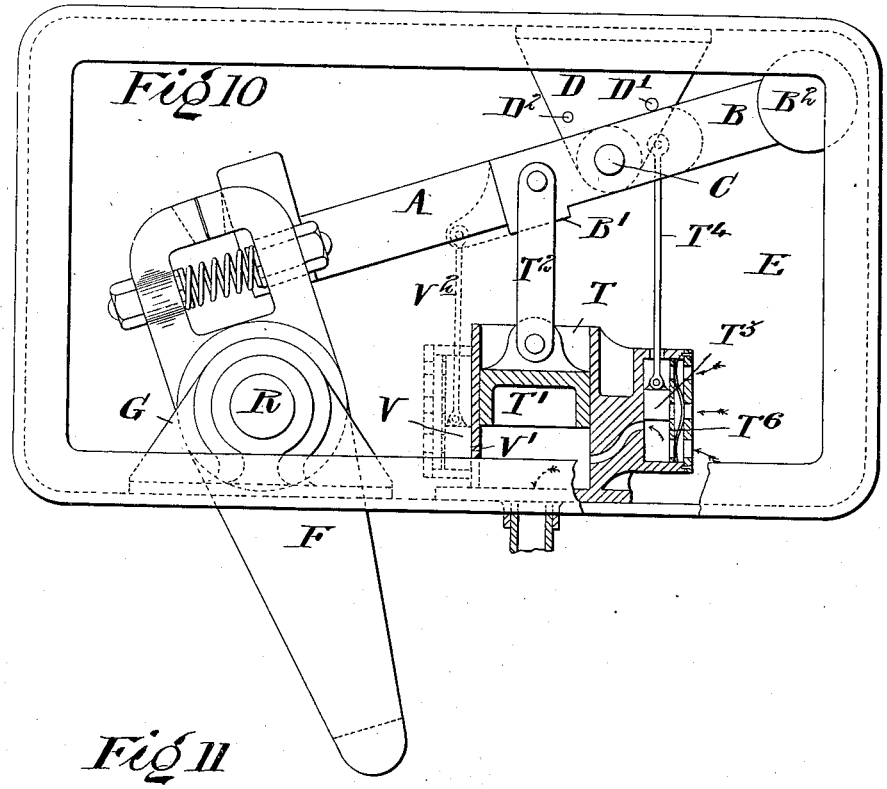
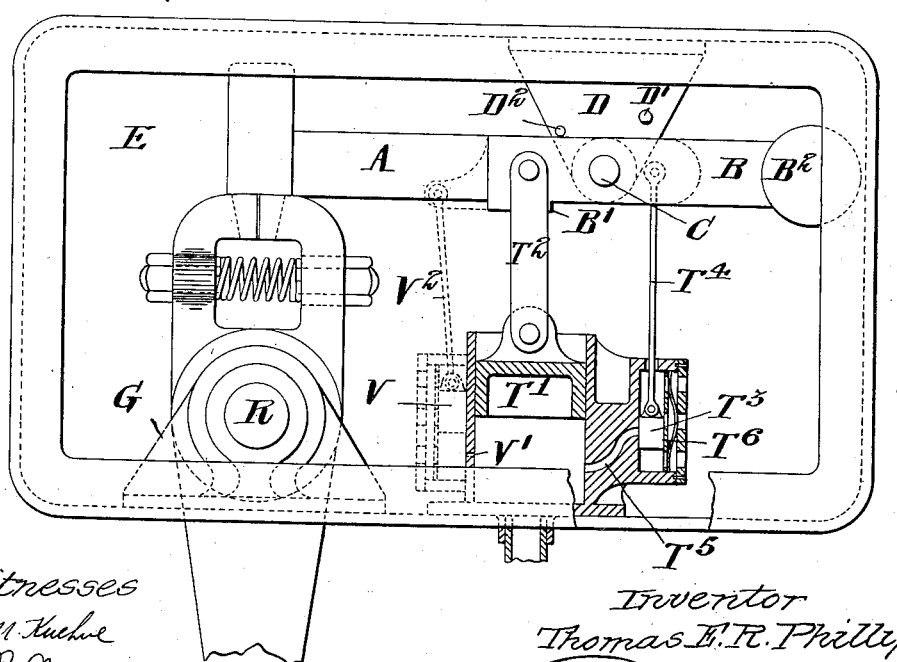

No. 827,940.
PATENTED AUG. 7, 1906.
T. E. R. PHILLIPS.
RAILWAY SIGNALING.
APPLICATION FILED NOV. 11, 1904.
7 SHEETS—SHEET 3.
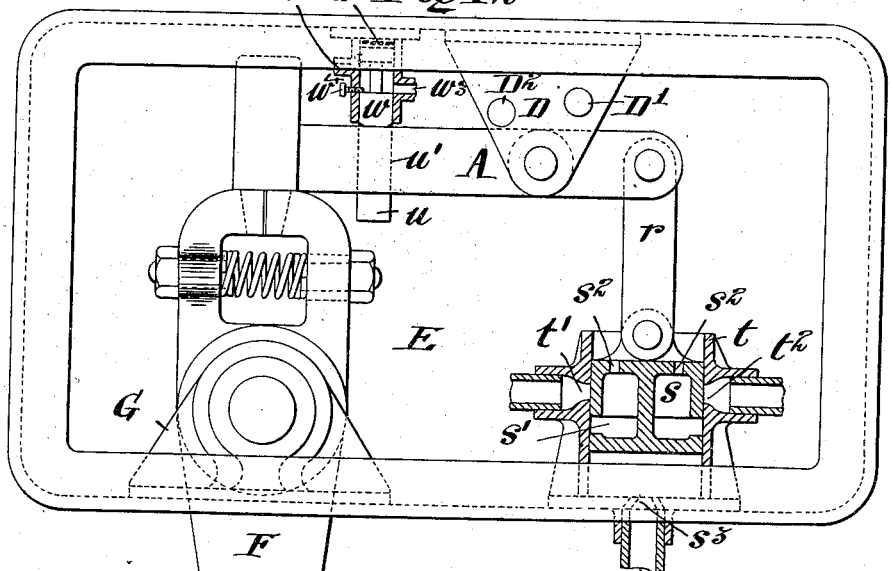
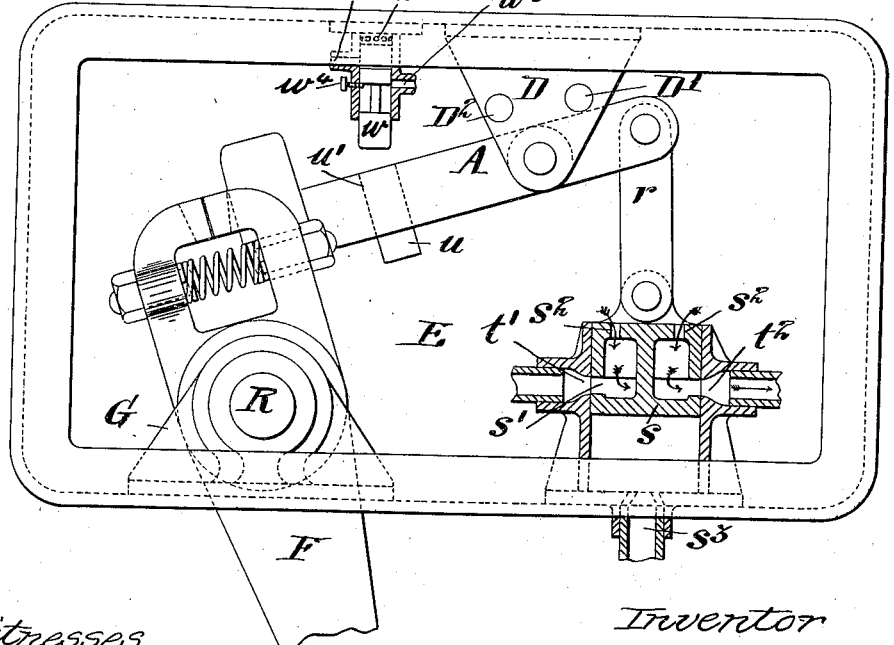
Witnesses
H. M. Kuehn
J. P. Newman
Inventor
Thomas E. R. Phillips
By Richardson
ATTORNEYS No. 827,940. PATENTED AUG. 7, 1906.
T. E. R. PHILLIPS.
RAILWAY SIGNALING.
APPLICATION FILED NOV. 11, 1904.
7 SHEETS—SHEET 4.
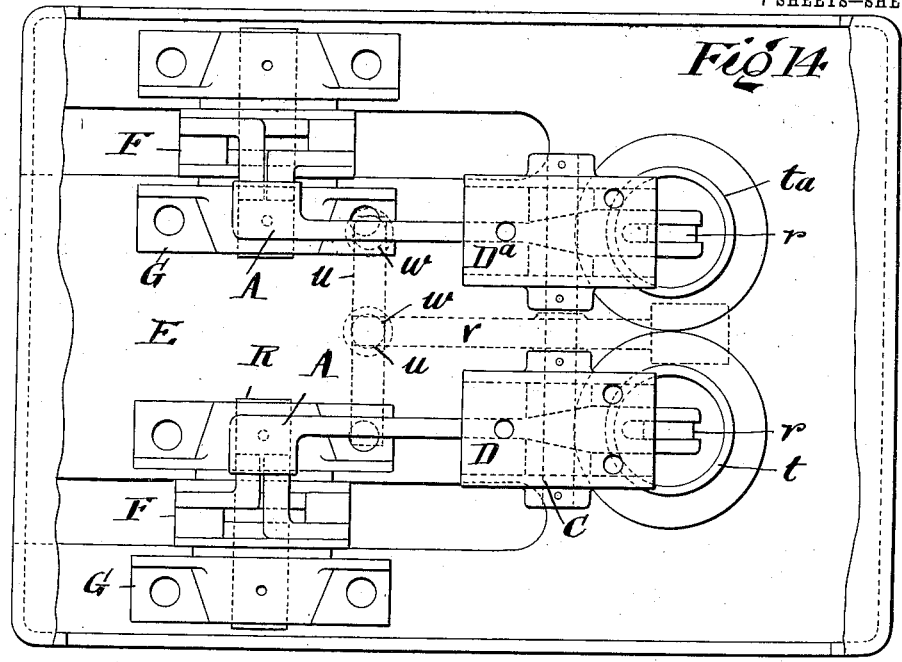
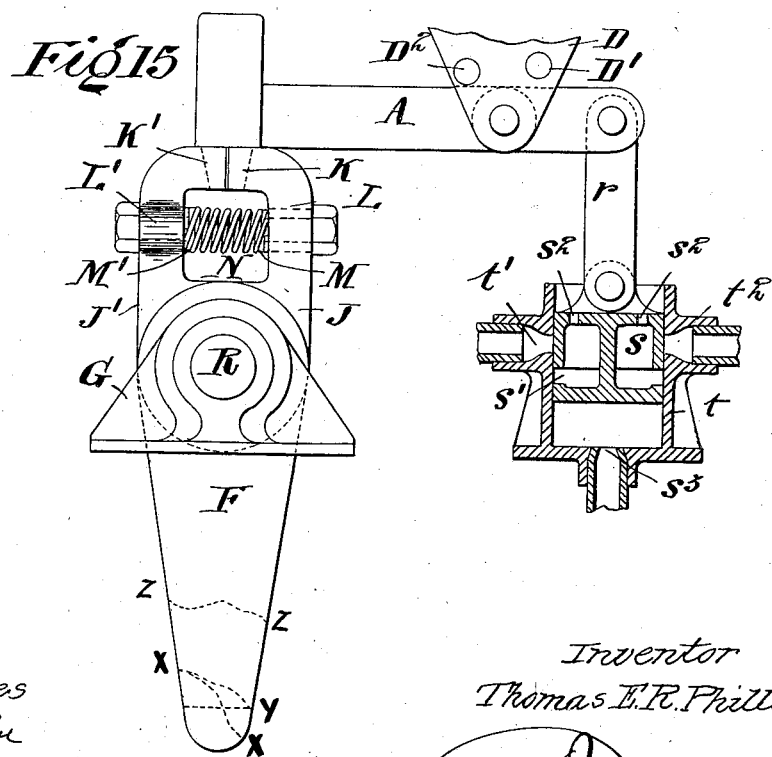

No. 827,940. PATENTED AUG. 7, 1906.
T. E. R. PHILLIPS.
RAILWAY SIGNALING.
APPLICATION FILED NOV. 11, 1904.
7 SHEETS—SHEET 5.
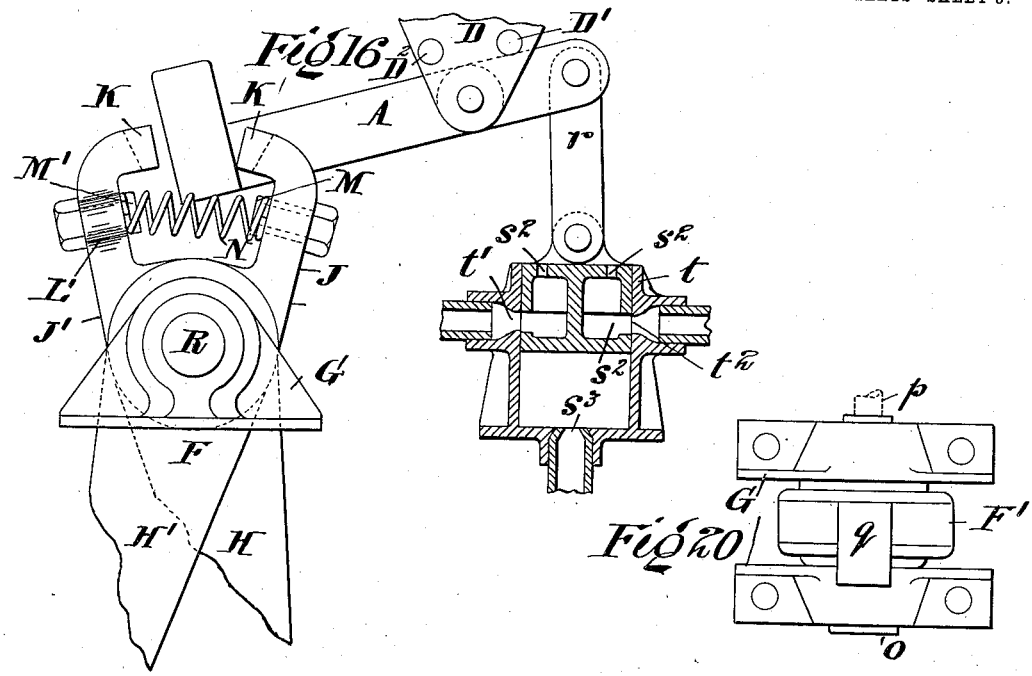
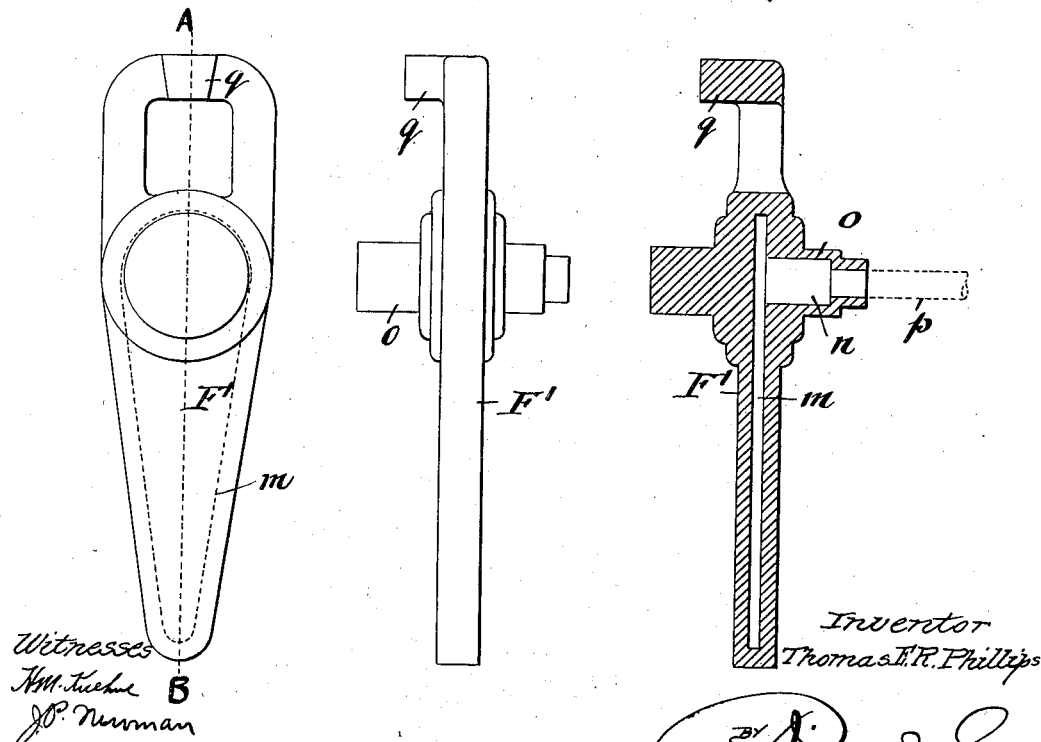
Witnesses
Inventor
Thomas E. R. Phillips
By Richardson
Att'ys No. 827,940. PATENTED AUG. 7, 1906.
T. E. R. PHILLIPS.
RAILWAY SIGNALING.
APPLICATION FILED NOV. 11, 1904.
7 SHEETS—SHEET 6.
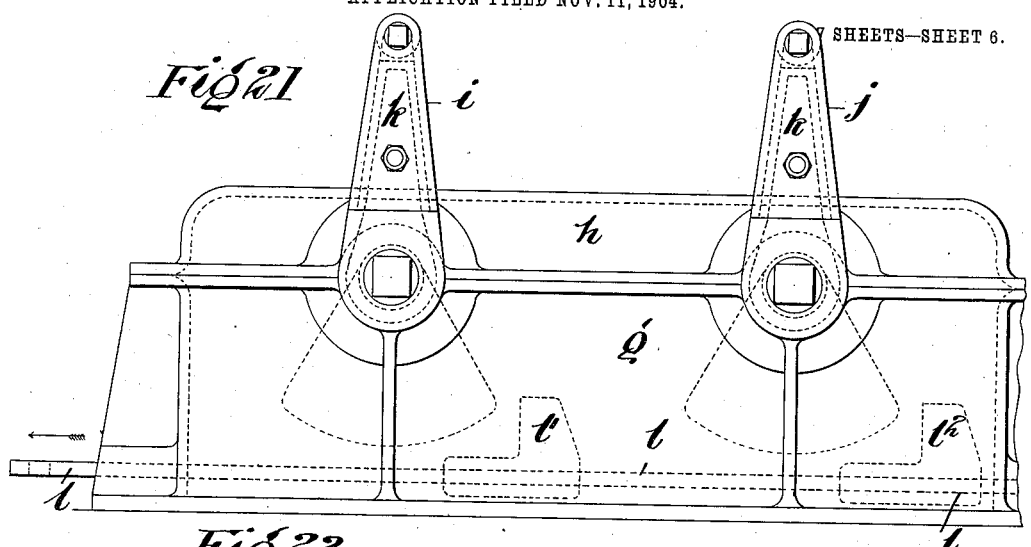
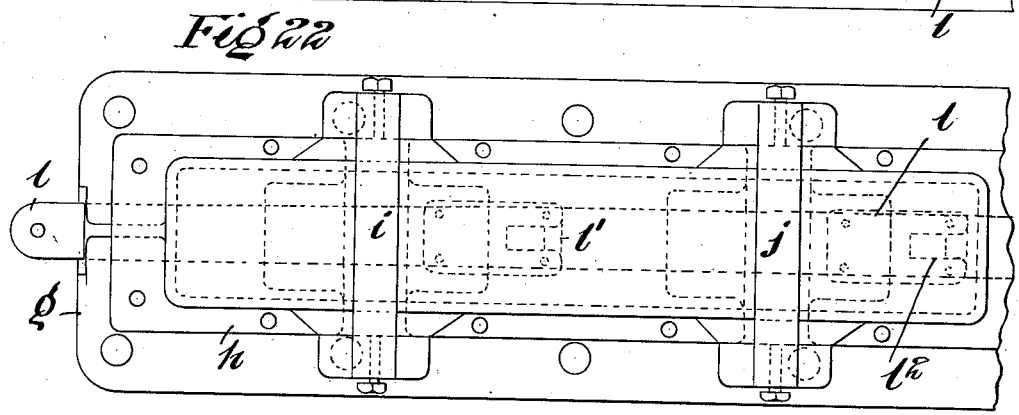
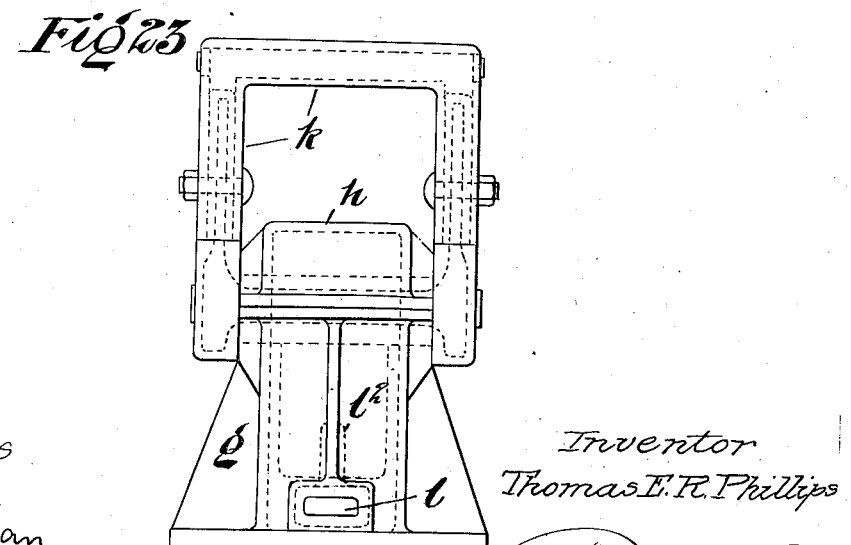
Witnesses
Inventor
Thomas E. R. Phillips

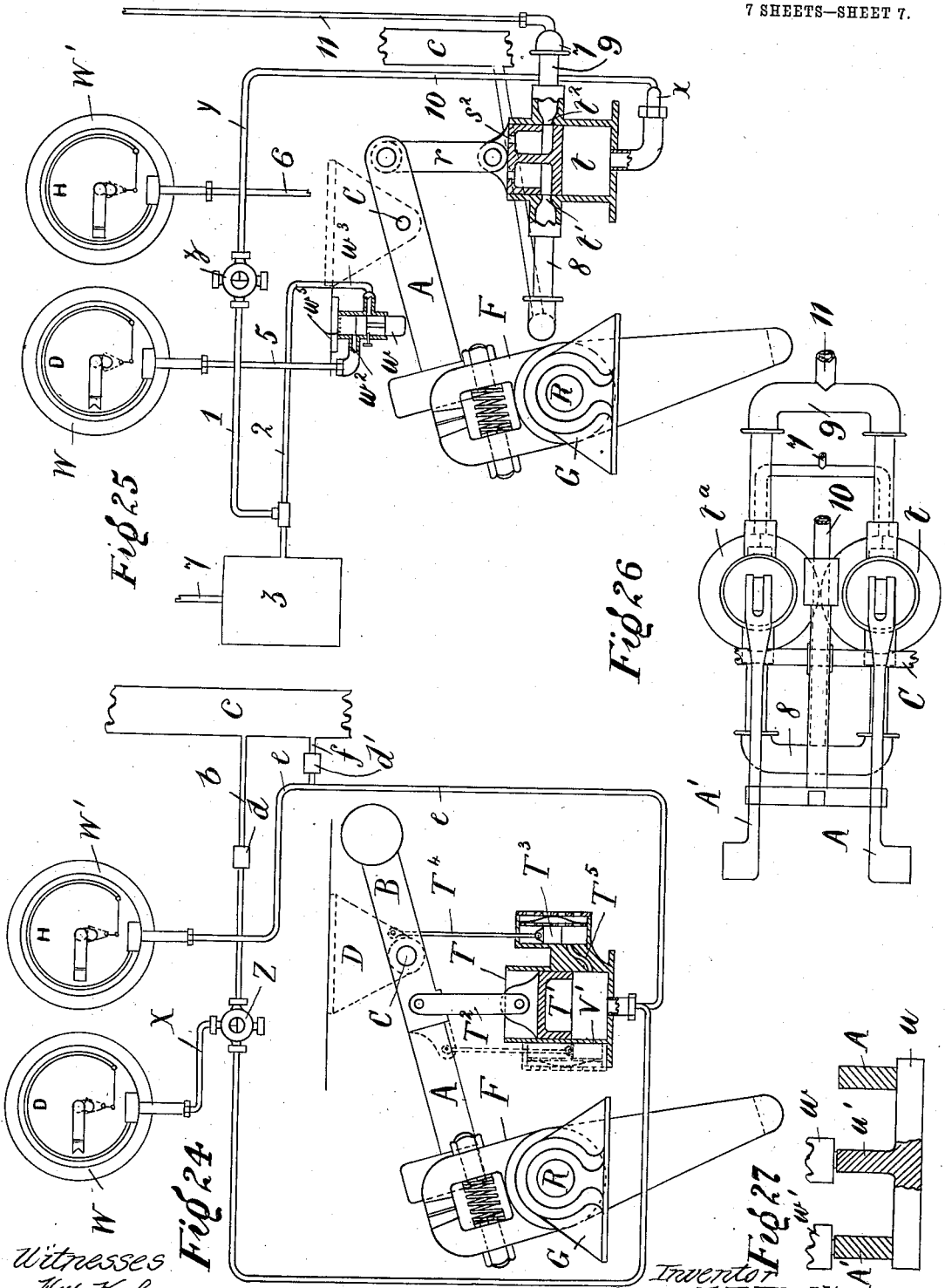

UNITED STATES PATENT OFFICE.

THOMAS ERNEST RAYMOND PHILLIPS, OF LONDON, ENGLAND.

RAILWAY SIGNALING.

No. 827,940.  Specification of Letters Patent.  Patented Aug. 7, 1906.

Application filed November 11, 1904. Serial No. 232,324.

*To all whom it may concern:*

Be it known that I, THOMAS ERNEST RAYMOND PHILLIPS, a subject of His Majesty the King of Great Britain, and a resident of 11 and 12 Finsbury Square, in the county of London, E. C., England, have invented certain new and useful Improvements in and in Connection with Railway Signaling, of which the following is a specification.

My present invention relates to and comprises an improved system of and method and apparatus for use in and in connection with railway signaling, and has for its objects to dispense with and supersede the diverse methods, means, and apparatus hitherto devised and employed for conveying to the engine or train drivers the necessary information concerning the conditions and meaning of the ordinary semaphore-signals when these from the weather or other causes are obscured from view, an important feature of my invention being that in addition to imparting to the drivers of the engines or trains such information above referred to the brakes are arranged to be automatically applied should a train run past either a home or starting signal, or, as they are sometimes referred to, a "home" or "home-warning" signal when either is at "danger," and for preference it would be arranged that such brakes cannot be released until the train is brought to a standstill, whereupon the brake-actuating apparatus may be automatically reinstated in readiness for the next following signal or set of signals.

For additional safety my invention also provides, if desired, that the brakes may be applied when a distant signal is passed in addition or supplementary to the warning given as hereinafter set forth; but where the application of the brakes may be arranged to be automatically applied when the train passes the distant signal the retention or otherwise of the brakes would in this case be preferably under the control of the driver for obvious reasons.

In order that my invention and the manner of carrying the same into effect may be readily and clearly understood, I have hereunto appended drawings, of which—

Figures 1, 2, and 3 are respectively front, side, and plan views of a movable vertically-depending device constructed in accordance with my invention. Figs. 4 and 5 are plan views of a pair of weighted arms or levers employed in conjunction with a pair of devices such as illustrated by Figs. 1, 2, and 3. Fig. 6 is a side view of the weighted arm as shown by Fig. 5. Figs. 7 and 8 are respectively side and plan views of a second weighted arm or lever which is provided with each of the arms or levers illustrated by Figs. 4 and 5. Fig. 9 is a side elevation of a box or casing (with the cover thereof removed) containing a plurality of the mechanisms disclosed by such side view, each mechanism comprising the parts shown by Figs. 1, 5, and 7 and a cylinder and one or more valves, the position of the mechanism being here shown at normal. Fig. 10 is a similar view to Fig. 9, but illustrating the position of one set of the apparatus in a brake-actuating position after being operated in the manner hereinafter described. Fig. 11 illustrates the automatic operation of replacing the mechanism from the position shown in Fig. 10 to that shown in Fig. 9, such operation being rendered fully clear hereinafter. Fig. 12 is a view corresponding to Fig. 9, but illustrating a slight modification of the previous construction. Fig. 13 illustrates such modified construction as shown by Fig. 12 when the mechanism has been operated and similarly positioned to that shown by Fig. 10. Fig. 14 is a plan view of the box or casing and mechanism contained thereby, said mechanism being, for example, that constructed according to the modification illustrated by Figs. 12 and 13, as the duplicate set of either arrangement of the apparatus so far referred to would be disposed in said box or casing substantially as shown in Fig. 14. Figs. 15 and 16 are views illustrating the result of the breakage of the vertical depending device. Figs. 17 and 18 are respectively front and side views of a modified form of depending device, Fig. 19 being a vertical section of same taken upon the line A B of Fig. 17 and Fig. 20 a plan view. Fig. 21 is a side elevation of a form of tripping-gear constructed in accordance with my invention. Figs. 22 and 23 are respectively plan and end views of the tripping gear illustrated by Fig. 21. Fig. 24 is a diagrammatical view illustrating the pipe connections of the brake-controlling apparatus according to the construction shown by Figs. 9, 10, and 11. Fig. 25 is a similar diagrammatical view illustrating the pipe connections of the brake-controlling apparatus according to the modification shown by Figs. 12, 13, and 14. Fig. 26 is a further diagrammatical plan view of a portion of the pipe connections shown by Fig. 25 in order to render the latter view quite clear. Fig. 27 is a detail view to be subsequently explained.

My invention consists in suitably attaching at any convenient position of the underframe or other portion of a locomotive or train one or more boxes, cases, or the like, within which may be compactly arranged a plurality of mechanisms, the particular number of which is optional, according to circumstances. For descriptive purposes the employment of two of such mechanisms or sets of apparatus in one box or casing has been taken as a general example, in which one set of apparatus is destined for use in connection with the distant signal and the other likewise for the home and starting or advance starting signals. According to one arrangement of my invention and referring to Figs. 1 to 11, each said mechanism or set of apparatus comprises a pair of weighted arms or levers A B, pivotally mounted upon a common spindle C, borne in a bracket D, fixed to the top of a preferably rectangular box or casing E, which is suitably provided with one or more covers.

The arm or lever A (hereinafter referred to as a "valve" arm or lever) is normally maintained in a horizontal or approximately horizontal position by means of a vertically-depending device F, borne by brackets G, attached to the base of said box or casing E the movement of such depending device F, as hereinafter described, permitting the valve-arm A to fall and operate a valve. The said depending device F preferably consists of a pair of parallel arms H H', integrally or otherwise connected at their extreme lower ends and having oppositely-situated members J J', forming their upper ends, which members J J' are provided with projections K K' not connected in any way with each other and oppositely-disposed swellings L L', the latter being for receiving a pair of T-headed bolts or the like M M', as shown, to each of which is connected the one end of a spring N, situated in a state of compression between the members J J'. Each of the said arms H H' is provided with a hole O, both holes being in line for receiving a bush P, and a pin or bolt R for pivotally mounting the device F, as at Fig. 9, while, if desired, a collar or sleeve S may be arranged between said arms H H', as shown in Fig. 2, for facilitating the operation of the device F when broken, as hereinafter described.

Adjacent to the device F and suitably connected (in the example given) to the base of the box or casing E is provided a cylinder T, the piston T' of which is attached by a connecting-rod T² to the forward end of the lever B, which latter (hereinafter termed a "replacing-lever") is provided with a horizontal projecting portion B' and a weighted rear portion B², the former being adapted to engage the valve-lever A when replacing this automatically. The movement of the replacing-lever is controlled as to the extent thereof by stops D' and D².

One side of the cylinder T is suitably provided with a valve, such as T³, attached by a connecting-rod T⁴ to the rear end of the valve-lever A and controlling an air port or passage T⁵, air being admitted to the valve-casing by providing this with a perforated cover and (when employed) a perforated spring-controlled plate T⁶, which may be provided to retain the valve T³ close up against the valve-casing and prevent leakage of air into the cylinder T, from lower end of which either at the bottom, as shown, or at the side a pipe connection is led for the purposes to be explained hereinafter.

In addition to the valve T³, I may find it advantageous to employ a second valve V at the other side of said cylinder T for controlling the admission of air to a port or passage V' in exactly similar manner as described with reference to the first-mentioned valve; but in the case of the valve V this would be connected to an extended portion of the replacing-lever B by a connecting-rod V², as suggested in dotted outline in Figs. 9, 10, and 11.

Although Fig. 14 illustrates in plan view a slight modification of the construction of the portion of my invention so far described, it will be clear on references thereto how two sets of the apparatus (illustrated in Figs. 9 to 11 and hereinbefore referred to) are arranged side by side in the box or casing E, and, as before stated, one set thereof is adapted for use in connection with the distant signal and the other with the home, starting, and advance starting signals.

Situated for preference within the cab of the engine I suitably fix at any convenient position a pair of gages W W', Fig. 24, which, as I have for the sake of an example and for descriptive purposes chosen to describe my invention as employed in connection with a vacuum-brake, will be referred to as "vacuum-gages," while as one of said gages, W, is destined for use in connection with the distant signal and the other, W', with the home and starting and advance starting signals they will hereinafter be distinguished by the respective designation of "distant vacuum-gage" or "distant gage" and "home vacuum-gage" or "home gage." For indicating purposes, although I may employ the ordinary gage-pointers, small semaphores are preferably substituted therefor, as shown. Obviously a compound gage may be employed instead of two gages, the position of the latter being, however, taken for example.

Referring to Fig. 24, the distant gage W would preferably be connected by a pipe X to the upper way of a four-way cock Z, open to the atmosphere at its lower portion and connected at one side by a pipe a to the cylinder T and on the other side by a pipe b to the train-pipe c, a check-valve d being interposed between said four-way cock and the train-pipe for permitting air to flow into the train-pipe for permitting air to flow into the latter through the pipe connections a b, while preventing any passage therefrom. The home vacuum-gage is connected by a pipe e to the cylinder of the duplicated set of apparatus in the box E without, as before, the intervention of a cock, such as Z, and such pipe e is in turn connected by a pipe f to the train-pipe, a check-valve d' being again interposed in the connecting-pipe f for the same purpose previously mentioned.

In addition to the foregoing and for the purpose of my invention I place and fix in a convenient position of the permanent way and may be adjacent to the distant, home, and starting and in some cases the advance starting signals a tripping-gear apparatus which, referring to Figs. 21, 22, and 23, consists of a box or casing g, having a removable weather-tight cover h and carrying in suitable pivotal connection therewith a pair, for preference, of counterbalanced U-shaped devices i j, each of which is provided with a renewable contact-piece, such as k, Fig. 23, and is arranged to be thrown out of action by the movement in the direction of the arrow, Fig. 21, of a bar l, which is provided with catches $l'$ $l^2$ for simultaneously engaging the lower weighted ends of said U-shaped devices i j and forcing these to assume a horizontal or substantially horizontal position when the signal-wire attached to the rod or bar l has been operated for line-clear position.

The distance the U-shaped devices k would project above the track when in a vertical position, as at Fig. 21, would be such that one of the vertically-depending devices F, comprising a portion of the brake-controlling apparatus contained in the box E, would come in contact therewith as the engine or train carrying said box and brake-controlling mechanism passed thereby, and, assuming, as stated, that my invention is employed in connection with a vacuum-brake and that with relation to the direction of the engine or train's motion the left-hand set of the duplicated apparatus in the box E controls the distant vacuum-gage W and the right-hand set the home vacuum gage W', one set of tripping-gear apparatus, as at Figs. 21 to 23, would be arranged on the left-hand side of the track for use in connection with or in lieu of the ordinary distant signal and similarly one set of such tripping-gear would be provided on the right-hand side of the track for use in connection with or in lieu of the ordinary home signal, an additional set being also likewise provided in respect of the starting and may be also the advance starting signals. If now the distant signal should be set at "danger," the release of the pull on the wire suitably controlling the bar l of the tripping-gear would permit the counterbalanced U-shaped devices i and k to automatically and simultaneously assume a vertical position, as at Figs. 21 and 23, and an engine or train carrying the brake-controlling mechanism, which latter would be in the position shown by Fig. 9, would in passing said tripping-gear in connection with said distant signal cause the left-hand depending device to strike the first of the opposing U-shaped devices i j, and the blow thus imparted to the depending device would deflect this, as shown in Fig. 10, and the support being thereby removed from the weighted valve-arm A the latter would fall until brought to rest against the projecting portion B' of the replacing-lever B, such movement of the valve-arm A thereby causing the rear end thereof to raise (through the connecting-rod $T^4$) the valve $T^3$ and open the air port or passage $T^5$ leading to the cylinder T beneath the piston T' thereof and permit the free passage of air through the perforated cover-plate $T^6$ and port $T^5$ of the valve-casing to the pipe a, leading from said cylinder T, through which pipe a the air passes to the four-way cock Z to the distant gage W and train-pipe c, the normal position of such cock Z being as shown in Fig. 24. In this manner the semaphore arm or pointer of the distant gage W would be placed into the danger position (shown in Fig. 24) and the brakes be automatically applied, thus indicating to the driver that he was passing or approaching a signal, which the position of the semaphore signal, which the position of the semaphore or pointer of the gage W would inform him was the distant signal, and that the same was at "danger." As, however, it is advisable that the brakes may be released by the driver at this point, the four-way cock Z is provided with a handle, so that it may be manipulated a quarter-turn to the right to cut off communication between the pipes a and b, while still retaining communication between a and X, and these with the atmosphere through the lower end of the four-way cock Z, whereupon as soon as the cylinder T below the piston T', and pipes a and X are full of air the weighted end of the replacing-arm B is free to fall by gravity and in so doing operates to raise by its forward engaging portion B' the valve-arm A clear of the upper portion of the depending device F, which latter then resumes its normal position beneath the valve-arm A, as shown in Fig. 10. The replacement of the valve-arm A also returns the valve $T^3$ to its normal position, covering the port $T^5$, and thus prevents any further passage of air to the pipe connection a. The cock Z being now returned to the position shown in Fig. 24 again opens connection between the pipes a, X, and b and the train-pipe c, whereby on the vacuum previously existing in the said pipe connections and beneath the piston T' being restored in the usual way the semaphore or pointer of the distant gage is returned to its ordinary line-clear position and the piston T' is drawn down and returns the replacing-lever B to the normal position. (Shown in Fig. 9.) It will thus be seen how after the automatic application of the brakes and operation of the semaphone or pointer of the distant gage to give indication, as described to the driver, the whole of the distant-signal-brake-controlling mechanism may automatically be reinstated by the mere operation of imparting a quarter-turn to the cock Z.

In a similar manner to that stated the depending device F of the mechanism controlling the home or starting or advance starting signals is operated upon and deflected by the tripping-gear at either of these signals when at danger position, in either of which instances, referring again to Fig. 24, the air admitted to the cylinder T of the duplicate mechanism by reason of the uncovering of the port $T^5$ by the movement of the valve-arm A, as described, passes, by way of the pipe $e$, to the home vacuum-gage W and also, by way of the pipe $f$, to the train-pipe $c$, thereby placing the semaphore or pointer of the home gage to danger position, as shown, and automatically applying the brakes, which latter in this case are, however, beyond the control of the driver, and the engine and train must be brought to a standstill, as the controlling mechanism for the home gage cannot become reinstated until the vacuum in the train-pipe is completely destroyed; but when this has been effected the replacing-lever B of the home-gage-brake-controlling mechanism then, as in the manner previously described, automatically operates to reinstate the said mechanism and close the valve $T^5$ thereof, whereupon the vacuum may be restored and the brakes released by the driver in the ordinary and well-understood manner, and the semaphore of the home gage being also thereby restored to normal or line-clear position.

Should the replacing arm or lever B of either set of brake-controlling apparatus fail to return from any cause from the position shown in Fig. 11 to its normal position, as at Fig. 9, such failure may be indicated to the driver on both the ordinary vacuum-gage and either the distant or home gage, according to which replacing-lever is at fault, owing to the before-mentioned supplementary valve V being arranged to open the port V' of the cylinder T to the atmosphere when the replacing-arm B is in the position shown by Fig. 11 and has consequently raised the valve V. Air is therefore free to pass through the perforated cover and spring-controlled plate of the valve-casing to the pipe connections, as previously described, and although the volume of air passing would preferably not be sufficient to apply the brakes the gages, as stated, would notify to the driver that one of the brake-controlling mechanisms had not returned to normal, and he would be prepared accordingly. Breakage of the connecting-rod T would also cause the brakes and gages to be operated by the valves $T^3$ falling and opening the port $T^5$.

A further safeguard in compliance with the board of trade regulations is provided for in the construction of the depending devices or striking-levers F, and, referring to Figs. 15 and 16, the operation and effect of one of these devices is shown in connection with a modified construction of brake-controlling mechanism yet to be described; but as the object to be attained in either form is the same—viz., to allow the valve-arm to fall—the illustrations given will be clearly understood with reference to the construction of the brake-controlling mechanism so far described.

Constant impact with the tripping-gear on the track of the depending devices or striking-levers F would approximately wear the contact-surfaces thereof, as suggested by the dotted lines X X, Fig. 15, and ultimately, if renewals are not made in time, as suggested by the dotted line X Y. Immediately the members H H' of either device are worn above their integral or other connection, as indicated by X Y, they are quite independent of each other and, assisted by the force of the spring N, would fall apart, as shown in Fig. 16, and removing the support of the projections K K' from the valve-arm would allow this to fall and in the manner described operate the distant or home gage and cause the brakes to be applied, and as there would be no longer any support for said valve-arm the apparatus could not be permanently reinstated until the broken depending device had been replaced by a new one. The dotted line Z Z indicates a possible fracture of one or both members which might occur, in which case the same action of the depending device would obtain and with the same result as stated.

In modification of the described form of the depending device F and referring to Figs. 17 to 20, I may instead of constructing the members H H' thereof with a connection at the lower end only form the said members integral to provide a depending device F', having a chamber $m$ therebetween in communication with the passage $n$, formed in one end of the spindle $o$, to which latter may be attached a flexible tube $p$, leading to the train-pipe and maybe the gages also. A solid projection $q$ would be provided at the upper portion of the device for supporting the valve-arm of the brake-controlling apparatus, as before. Such device F' would operate in all respects similar to the device F, except that when the contact-surface became worn through or broken by impact with the tripping-gear the chamber $m$ would be open to the atmosphere and allow air to pass through the hollow end of the spindle $o$ and pipe $p$ to the train-pipe, and so effect the application of brakes, and investigation consequent thereon would, as before, bring out the necessity of replacing the worn device by a new one.

As a slight variation of the brake-controlling apparatus shown by Figs. 9 to 11 and herein described with reference thereto I may with each set of said apparatus dispense with the replacing-lever B and in lieu of the valve $T^3$ so modify the piston $T'$ that this may perform the functions of a valve for controlling the application of the brakes. The supplementary valve V of the previous construction is also dispensed with; but I prefer, according to the example given in Fig. 25 of the operation of the modified construction, to still provide a supplementary valve for each set of apparatus and arrange said valves in conjunction with a slot-bar in the manner and for the purposes hereinafter set forth.

Referring to Figs. 12, 13, and 14, the valve-arm A of each set of the modified brake-controlling apparatus is pivotally borne by a pin or bolt C in a bracket D and is similarly supported in normal position by the depending device F, mounted in the box E, as previously described. In this case, however, the rear end of the valve-arm A is attached by a connecting-rod $r$ to a double-ended piston $s$, working in a cylinder $t$, having through-openings $t'$ $t^2$, both of which openings the piston $s$ is arranged to control, and by means of an annular opening $s'$, formed in the piston, communication of the openings $t'$ $t^2$ with each other and to the atmosphere through the hole $s^2$ may be obtained. As will be subsequently seen, such hole $s^2$ may be dispensed with or used merely as supplementary air-passages. A further opening $s^3$ is also provided at the bottom or side of the cylinder $t$. Motion in either direction of the arm A may be limited by stops $D'$ and $D^2$, and the movement from normal of either arm A A' of the duplicated brake-controlling mechanism, as shown in Fig. 14, is arranged to operate a slot-bar $u$, provided at the end of lever $v$, weighted at its rear end and pivotally mounted upon the rod or spindle C between the brackets D D$^a$. As illustrated by Fig. 27, the slot-bar $u$, which passes beneath the arms A A', has an upward-projecting piece $u'$, which normally bears against and retains in the position shown in Fig. 12 a valve $w$, situated midway or thereabout between the duplicate arms A A'. A second valve $w'$ is provided immediately above the arm A', which latter normally bears against and retains the said valve $w'$ in the same position as the valve $w$ is shown in Fig. 12, the casings of both valves having openings $w^2$ and $w^3$ therein, which owing to the reduced central portion of each valve are normally in communication with each other, but are cut off when the valves fall the extent permitted by the stop $w^4$, the upper of the openings then being open to the atmosphere through perforations $w^5$ at the top of the casing.

As in the previous arrangement, the left-hand set of the duplicate apparatus, Fig. 14, will be assumed to be that destined for use in connection with the distant signal and the right-hand set with the home signal. Therefore the previous description as to the position and arrangement of the tripping-gear apparatus will suffice, and, referring to Figs. 24 and 25, the pipe connections of the duplicated apparatus are preferably arranged as follows: The duplicate cylinders $t$ $t^a$ are in communication at their lower ends by a U-pipe connection which has a pipe $y$ leading therefrom to a three-way cock $z$, the other side of which latter is connected by a pipe 1 to a pipe 2, leading in one direction to the reservoir 3, which is independent of the main brake-reservoir, and in the other direction to a U-pipe 4, connecting the lower openings $w'$ of the valve $w$ and $w'$, the upper openings $w^2$ of which are respectively connected by pipes 5 and 6 to the distant vacuum-gage W and home vacuum-gage W'. The supplementary reservoir 3 is in communication with the pump or ejector by a pipe 7, and the cylinders $t$ $t^a$ are coupled together by U-pipe connections 8 and 9, leading to the openings $t'$ $t^2$ of both cylinders and having a pipe 10 communicating said U connections with the train-pipe $c$ and a pipe 11, leading to atmosphere by means of a siren or whistle, (not shown,) if desired. Upon an engine and train passing the tripping-gear in connection with the distant signal when said tripping-gear is at danger position, as shown in Fig. 21, the depending device F of the distant controlling mechanism would be deflected, as shown in Fig. 13, and, as before described, the support being removed from the valve-arm A, the weighted forward portion of this would fall until arrested by the stop $D'$, and thereby cause the rear end of A to raise the piston $s$ and bring the annular opening $s'$ thereof in line with the opening $t'$ $t^2$ of the cylinder $t$. Simultaneously the fall of the lever A would take with it the slot-bar $u$ and remove the projection $u'$ away from the valve $w$, which latter would therefore drop down until arrested by the stop $w^4$, in which position the opening $w^2$ is placed into communication with the atmosphere through the perforations $w^5$ and at the same time cut off from the opening $w^3$. Air is therefore free to enter through the perforation $w^5$, opening $w^2$, and pipe 5 to distant vacuum-gage W, the semaphore of which is consequently actuated to the danger position shown in Fig. 25. Simultaneously air is also free to enter through either the whistle or siren (and thus give an audible warning) and pipe 11 or the holes $s^2$ of $s$, or both, to the U-pipe connections 8 and 9 by way of the through-passage insured by the position of the cylinder $t$, from which U-pipe connections it is free to escape by way of the pipe 10 to the train $c$, and thus effect the application of the brakes, the release of which in this embodiment of my invention is always under the driver's control.

The normal position of the three-way cock is as shown in Fig. 25, with the lower way thereof (which is open to atmosphere) in communication by the pipe $y$ to the lower part of the cylinder $t$. When the brakes are to be released and the controlling apparatus restored, (as would usually be immediately done at the distant signal,) a quarter-turn to the right of the cock $z$ would cut off the atmosphere and place the space below the piston in direct communication by pipes 1, $y$, and 2 with the supplementary reservoir 3, and the vacuum thus created in the cylinder $t$ below its piston $s$ would draw down the latter and raise the valve-arm A to normal, while the automatic return of the counterbalanced slot-bar $u$ would close the valve $w$ by the projection $u'$ and open communication between the gage W and reservoir 3 by way of pipes 2 5 and openings $w^2$ and $w^3$, thereby restoring the semaphore of gage to line-clear position. The return movement of the piston $s$ to normal, as at Fig. 12, would at the same time cut off communication across the cylinder $f$, and so prevent any further passage of air to the train-pipe, and the brakes would therefore be released. A similar operation would take place in passing the tripping apparatus at danger position in connection with the home, starting, and advanced starting signals, except that in either of these cases the deflection of the depending device striking, say, the home tripping apparatus would allow the arm A', Fig. 27, to fall, and thus carrying with it the slot-bar $u$ would not only allow the valve $w'$ to open, but the valve $w$ also, by which means both gages W and W' are placed into communication with the atmosphere in the manner described and both semaphores thereof consequently go to "danger." Air is, as before, free to pass to the train-pipe in the manner stated, but this time by way of the duplicate cylinder $t^a$, the passage through which may be cut off and the apparatus reinstated by manipulating the cock $z$, as before, the automatic replacement of the arm A' closing the valve $w'$ and the return of the slot-bar $u$ (by means of the projection $u'$ thereof) the valve W, whereupon the semaphores of both gages W W' are returned to normal and the whole mechanism is made ready for further use by the simple manipulation of the three-way cock $z$.

As hereinbefore stated, I wish it to be understood that the invention is not limited to the employment of two sets of brake-controlling apparatus in the box or casing E; neither are the arrangements of the pipe connections to be considered restricted to the example given, as obviously such connections may readily be modified as circumstances may render desirable, and as an illustration of this in connection with the modified construction I may mention that the distant brake-controlling apparatus can be arranged to be only replaced if required when the home signal is reached by providing a third set of apparatus in the box E and arranging the cylinder thereof at normal position to cut off communication between the bottom of distant cylinder and reservoir. If then an additional tripping-gear be provided in connection with the home signal and arranged to operate to deflect the depending device of the third mechanism, if the home signal be at "line clear," the raising of the third or replacing cylinder would open communication between the bottom of distant cylinder and reservoir, and so effect the replacement of the mechanism, as hereinbefore described. The home and replacing cylinder would be coupled with the three-way cock $z$ for reinstatement (after being operated) by the driver in similar manner described with reference to Fig. 25, and it may be observed that with the third or replacing set of apparatus a valve corresponding to $w$ or $w'$ is not required, or the home vacuum-gage may be dispensed with and signals only given at the distant signal, the home-signal-controlling apparatus being then utilized for replacing the distant mechanism, while to prevent possibility of the driver omitting to restore to normal the replacing mechanism a whistle may be arranged in well-known manner to be sounded until such mechanism is replaced. The distant gage may when the home signal is at "line clear" and the starting-signal is at "danger" be arranged to be actuated at the home signal by an extra tripping-gear in similar manner to that set forth.

It will be obvious that without departing from the principle of my invention I may invert the position of the cylinder $t$ and arrange it at the top of the casing E and connect the upper end of said cylinder to the reservoir, so as to keep the valve-arm against the under part of the projection of the depending device, which latter would consequently when deflected allow the valve-arm to move in the opposite direction to that described for attaining the desired ends.

Referring to the tripping-gear, Figs. 21 to 23, I prefer, as shown, to provide duplicate striking-pieces $i$ $j$ as a safeguard should one break, and, if desired, one of these may be held down by a wire suitably connected thereto and passed through and fixed across the striking portion of the other, so that should such striking portion and wire be broken the other and counterbalanced tripper will at once assume a vertical position, and when it is held down it may be arranged to hold a locking-pin clear of a recess in the bar $l$, so that such locking-pin would be free to engage such recess and lock the bar $l$ when the released tripper took up a vertical position, as stated, or the tripping-gear, as described herein, may be arranged in well-known manner when at danger position, as at Fig. 21, to maintain a closed circuit with an electric indicator in the signal-cabin, so that should any one wilfully place these or either thereof at line-clear position the circuit will be broken and an indication given to the signalman thereof.

For controlling junctions where a plurality of ordinary semaphore-signals are employed one or more tripping-gear apparatus may be arranged applicable to the whole of such signals in similar manner to that described in my previous application for Letters Patent, Serial No. 18,651, dated August 29, 1903.

Notwithstanding I have described my invention as employed in conjunction with and as a repeater of the ordinary mechanically-operating signals, it may be employed alone or with or without a slight modification be readily applied for use in connection with pneumatically, electrically, or otherwise operated signals, while for indicating to the driver when to proceed when stopped at any signal a suitable optical, sonorous, or other signal may be arranged in well-known manner to be given at the side of the track. It will also be obvious that although described with a reference to a vacuum-brake my invention may equally be applied for use in connection with pressure or other brakes, and in order that the apparatus on the engine may not be rendered useless if the engine is running bunker front the tripping-gear may be applied at both sides of the track at each location.

Having now described my invention, what I claim as new, and desire to secure by Letters Patent, is—

1. In connection with railway signaling, means for repeating the position of the ordinary track-semaphore on the engine said means comprising a gage having a pointer adapted to be pneumatically actuated, a valve, a pivoted lever in connection with said valve and a pivoted depending device, said depending device normally supporting said lever and thereby keeping the valve closed until the said device is deflected and said valve being connected by piping to said gage and the train-pipe of the brake system, substantially as described.

2. In connection with railway signaling, means for repeating the position of the ordinary track-semaphore on the engine said means comprising gages having pointers adapted to be pneumatically actuated, valves connected to said gages and the train-pipe of the brake system, a pivoted lever in connection with each of said valves and a pivoted depending device normally supporting each of said levers and keeping the valves closed until deflected, substantially as described.

3. In connection with railway signaling, automatic brake and gage indicator controlling apparatus consisting of a set of mechanism mounted in a box or casing and comprising a pivoted depending device, a weighted valve-arm A pivoted at C normally supported by said device, stops $D'$ $D^2$ for limiting motion of said arm A, a cylinder $t$ having a through-passage $t'$ $t^2$, opening $s^3$ and a piston $s$ connected to the arm A, said piston having openings $s'$ and $s^2$, a valve $w$ controlling openings $w^2$ $w^3$ and air-passages $w^5$ in the casing thereof, a stop $w^4$ for limiting movement of said valve $w$, pipe connections for respectively communicating said valve $w$ to an independent reservoir 3, and an indicating-gage, and the cylinder $t$ to the train-pipe and to the atmosphere through a siren, substantially as described.

4. In connection with railway-signaling automatic brake and gage indicator controlling apparatus, consisting of sets of mechanism mounted in a box or casing each set comprising a pivoted depending device, a weighted valve-arm A pivoted at C and normally supported by said device, stops $D'$ $D^2$ for limiting motion of said arm A, a cylinder $t$ having a through-passage $t'$ $t^2$, opening $s^3$ and a piston $s$ connected to the arm A, said piston having openings $s'$ and $s^2$, a valve $w$ controlling openings $w^2$ $w^3$ and air-passages $w^5$ in the casing thereof, a stop $w^4$ for limiting movement of said valve $w$, pipe connections for respectively communicating said valve $w$ to an independent reservoir 3 and an indicating-gage, and the cylinder $t$ to the train-pipe and to the atmosphere through a siren, substantially as described.

5. The combination with duplicate sets of railway signaling apparatus of the kind described of a slot-bar $u$ pivoted between and coöperating with the arms A A' and having a projection $u'$ for controlling the valve $w$ of the valves $w$ $w'$, said valves $w$ $w'$ being connected at the upper openings thereof with the gages W W' and at their lower openings with a U-pipe in communication with an independent reservoir, a U-pipe connection coupling the lower portions of the duplicate cylinders $t$ $t^2$ with each other and communicating with said independent reservoir, a three-way cock for controlling said communication between the reservoir and said cylinder the through-passages of which latter are coupled by U-pipe connections communicating by a pipe leading therefrom to the train-pipe, substantially as described.

6. The combination with a duplicate set of brake and gage indicator controlling apparatus as set forth, of means for only permitting reinstatement at the home signal, of the apparatus actuated at the distant signal, consisting of providing a third set of apparatus in connection with said duplicate set, substantially as described.

7. The combination of signaling apparatus of the kind set forth on an engine with tripping-gear apparatus comprising a weather-proof casing, a counterbalanced U-shaped device freely mounted therein, and a bar having an engaging part, and adapted to slide in said casing and operate said U-shaped device to line-clear position, substantially as described.

8. The combination of signaling apparatus of the kind set forth on an engine with tripping-gear apparatus comprising a weather-proof casing counterbalanced U-shaped devices freely mounted therein, and a bar having engaging parts and adapted to slide in said casing and operate said U-shaped devices to line-clear position, substantially as described.

9. The combination of signaling apparatus of the kind set forth on an engine with tripping-gear apparatus comprising a weather-proof casing $g\ h$, a pair of counterbalanced U-shaped devices $i\ j$ freely mounted in said casing, and having removable contact-pieces $k$, and a bar $l$ having engaging parts $l'\ l^2$ and adapted to slide in said casing and operate said U-shaped devices simultaneously to line-clear position, the said devices automatically returning to danger position on the release of the bar $l$, substantially as described.

10. The combination with tripping-gear apparatus of the kind set forth, a pair of counterbalanced U-shaped devices $i\ j$ of means for retaining one of the devices $i\ j$ at line-clear position until the other is broken, consisting of a wire connecting one of said devices to the other and passing across the contact portion of the device in use, substantially as described.

11. The combination with tripping-gear apparatus of the kind described, of a pair of counterbalanced U-shaped devices $i\ j$, of means for retaining one of the devices $i\ j$ at line-clear position until the other is broken, consisting of a wire connecting one of said devices to the other and passing across the contact portion of the device in use, and a pin or bolt arranged to engage and lock said bar $l$ upon the release of the retained device, substantially as described.

12. In an apparatus of the class described, a depending device or striking lever $F'$ having a projection $q$, chamber $m$, and partly-hollow spindle $n$ communicating said chamber $m$ with the train-pipe, substantially as described.

13. In an apparatus of the class described, a depending device or striking lever $F'$ having a projection $q$, chamber $m$, with the train-pipe and gages, substantially as described.

In witness whereof I have hereunto set my hand in presence of two witnesses.

THOMAS ERNEST RAYMOND PHILLIPS.

Witnesses:
HENRY CONRAD HEIDE,
ALBERT GEORGE BARNES.